United States Patent [19]

Pioch et al.

[11] 4,414,743
[45] Nov. 15, 1983

[54] CIRCULAR SAW

[75] Inventors: Peter P. Pioch, Idstein; Annette Schober, Niederams, both of Fed. Rep. of Germany

[73] Assignee: Black & Decker Inc., Newark, Del.

[21] Appl. No.: 329,218

[22] Filed: Dec. 10, 1981

[30] Foreign Application Priority Data

Dec. 11, 1980 [GB] United Kingdom ............ 8039712

[51] Int. Cl.$^3$ ............................................. B26D 7/06
[52] U.S. Cl. .................................... 30/124; 30/390; 83/100; 83/574
[58] Field of Search ............... 30/388, 390, 391, 264, 30/295, 124, 166 R, 133; 83/574, 100; 51/273

[56] References Cited

U.S. PATENT DOCUMENTS

| | | |
|---|---|---|
| 180,815 | 8/1857 | Bentley . |
| 963,520 | 7/1910 | Costello . |
| 1,175,963 | 3/1916 | Loeser ............................ 30/390 |
| 1,644,432 | 10/1927 | Howland . |
| 1,737,552 | 12/1929 | Altman et al. . |
| 1,888,679 | 11/1932 | Knapp . |
| 3,128,802 | 4/1964 | Hostetter ...................... 83/574 X |
| 3,245,439 | 4/1966 | Sheps et al. . |
| 4,051,880 | 10/1977 | Hestily ......................... 51/273 X |
| 4,241,505 | 12/1980 | Bodycomb ................... 83/100 |

FOREIGN PATENT DOCUMENTS

| | | |
|---|---|---|
| 5883181 | 4/1968 | Fed. Rep. of Germany . |
| 7411811 | 4/1974 | Fed. Rep. of Germany . |
| 2754186 | 7/1979 | Fed. Rep. of Germany . |

*Primary Examiner*—E. R. Kazenske
*Assistant Examiner*—Douglas D. Watts
*Attorney, Agent, or Firm*—Ronald B. Sherer; Edward D. Murphy; Harold Weinstein

[57] ABSTRACT

A portable circular saw has a saw-blade compartment for accommodating a circular saw-blade, a motor compartment secured to the saw-blade compartment and projecting transversely therefrom away from the saw-blade, a rear handle extending rearwardly from the saw-blade compartment, and a forward handle connected to the saw-blade compartment and projecting transversely therefrom away from the saw-blade. The forward handle is hollow and defines a passageway therein which is in communication with the interior of the saw-blade compartment and is also adapted to be connected to a vacuum system, whereby this forward handle forms part of a sawdust removal system. Preferably, a strut forms part of and connects the forward handle to the motor compartment thereby defining a closed handle. The passageway in the forward handle is preferably connected to a fan in the motor compartment, but may be connected to an external source of vacuum. The housing of the saw may be constructed of three molded parts facilitating ease of assembly and providing a particular two handle arrangement designed to provide improved handling of the saw

14 Claims, 10 Drawing Figures

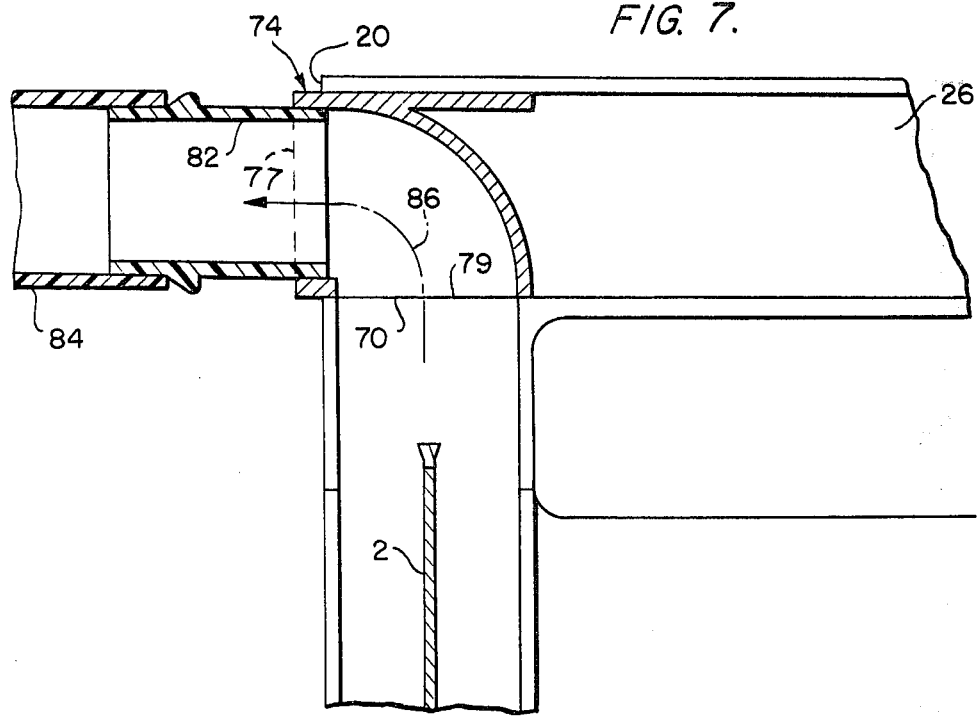
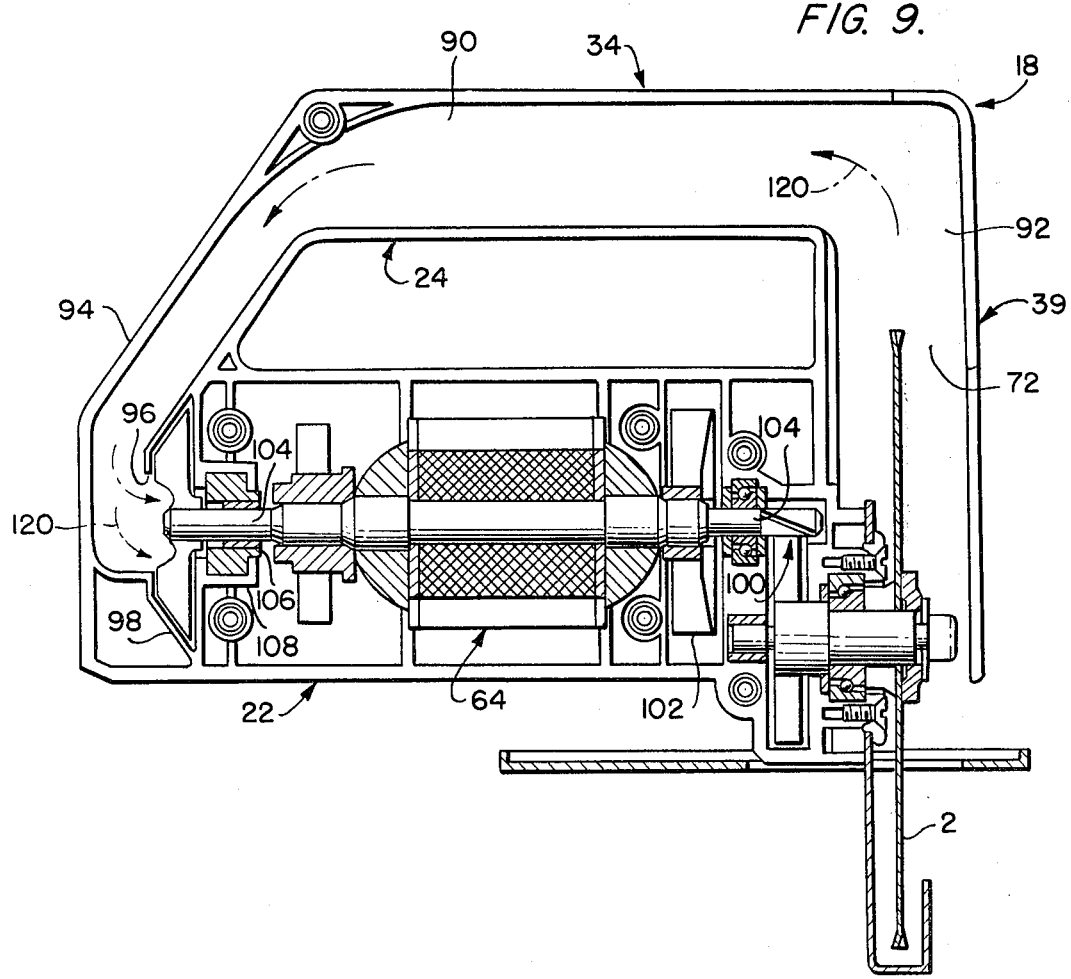

CIRCULAR SAW

FIELD OF THE INVENTION

The present invention relates to portable circular saws, and more particularly to improvements in sawdust removal therefrom. The present invention also relates to improvements in the versatility and ease of operation of portable circular saws and in the housing structure thereof.

BACKGROUND OF THE INVENTION

Over the years circular saws have been proposed with specific individual problems in mind, for example, ease of construction, or method of operation, or dust removal, etc.

It has been proposed in U.S. Pat. No. 3,245,439 to make the housing of a portable electric saw in two complementary halves which mate in a plane which includes the rotational axis of the electric motor. Each half includes a half of the motor compartment in which the motor is mounted in clamshell fashion. However, this housing arrangement only provides one open handle by which an operator controls the portable saw.

Circular saws with two handles are known as shown in U.S. Pat. No. 180,815, and still other arrangements are known wherein a handle is in line with the circular saw-blade as shown in U.S. Pat. No. 963,520.

However, all of these arrangements do not give the operator the complete control over the circular saw that may be desirable. For example, in U.S. Design Patent 180,815 both handles are to one side of the saw-blade so that the operator tends to impart a turning moment to the circular saw making it very difficult for the operator to hold precisely on the cutting line of the workpiece. On the other hand, although U.S. Pat. No. 963,520 shows a handle in line with the saw-blade, here there is no second handle and an operator cannot control the unit with both hands.

It has been proposed in German Utility Model Publication No. 588,318 to invert a circular saw and clamp it on a workbench to use it as a table saw. However, the stability of the inverted circular saw, if operated in this way, would require careful consideration.

Various dust extraction arrangements with circular saws have been proposed. In one such arrangement, shown in U.S. Pat. No. 1,888,679, a nozzle extends from the saw-blade compartment rearwardly of the saw and has an adjustable elbow through which the dust can be directed in a desired direction. The dust is discharged by the combination of centrifugal force and the air current created by the revolving blade. However, with such an arrangement only a limited amount of the dust produced may be discharged.

In more improved arrangements, it has been proposed to mount a fan on the armature shaft of the motor and arrange for the fan to draw the dust from the saw-blade housing and discharge it into a dust bag. In this respect German Offenlegungsschrift No. 27 54 186 discloses a portable circular saw having a dust removal system in which one end of the dust bag is connected via a short conduit to the saw-blade compartment forwardly of the motor compartment, and the other end of the dust bag is connected via a longer special conduit to the outer end of the motor compartment containing the fan. Also, German Published Patent Application 7411811 discloses a portable electric saw having a dust removal system with the fan mounted in the outer end of the motor compartment and arranged to draw dust from the saw-blade compartment through a passage specially formed in the motor housing; the dust is then discharged forwardly through a nozzle into a dust bag located in the forward direction ahead of the saw. With both these proposals, dust conduits have to be specially provided; also, the dust bags limit some of the operator's forward view of the workpiece being cut. Further, the saws are not adapted for ease of operation and versatility.

SUMMARY OF THE INVENTION

The present invention is concerned with improving the housing structure of portable circular saws to enable the saws to be more efficiently manufactured and assembled, and yet provide the basis for incorporating many specialized features, such as dust removal, ease of operation, and versatility.

Accordingly, it is an object of the invention to provide a portable circular saw having at least part of a dust removal system incorporated therein in an improved manner.

In this respect, the main feature of the invention is the provision of a forward hollow handle providing a passageway in communication with the saw-blade compartment and through which passageway sawdust can be removed.

It is another object of the invention to provide a portable circular saw which can be safely and conveniently guided down the cut line.

Accordingly, another feature of the invention is the provision of a rear handle in line with the saw-blade so that in conjunction with the arrangement of the forward handle, the saw, when gripped by an operator, is balanced about the motor compartment.

Yet another feature of the invention is the construction of the circular saw housing from three housing parts which conjointly form the forward and rear handles, the motor compartment, and the saw-blade compartment. This has the advantage of facilitating ease of assembly, including the dust removal system.

Accordingly, therefore, there is provided according to one aspect of the invention a portable circular saw or the like comprising a saw-blade compartment for accommodating a circular saw-blade, a motor compartment secured to the saw-blade compartment and projecting transversely therefrom away from the saw-blade, a motor in the motor compartment for driving the saw-blade, a rear handle extending from the saw-blade compartment and being preferably in line with the plane of the saw-blade, and a forward handle connected to the saw-blade compartment and projecting transversely therefrom away from the saw-blade. The forward handle is positioned forwardly of the motor compartment in the direction of the material to be cut. The forward handle is hollow and defines a passageway therein which is in communication with the interior of the saw-blade compartment and is also adapted to be connected to a vacuum system, whereby the forward handle forms part of a dust removal system.

A strut preferably connects the forward handle to the motor compartment at a location spaced from the saw-blade compartment thereby defining a closed handle.

A fan may be mounted in the motor compartment with one end of the passageway in the forward handle being in communication with the fan, whereby sawdust generated in the saw-blade compartment is drawn by the fan through the passageway and discharged.

Alternatively, the sawdust may be withdrawn through the passageway, or part thereof, by connecting an external source of vacuum to the passageway; a deflector member may be at least partially disposed in the passageway and be movable between first and second positions to enable the sawdust to be withdrawn from either end of the passageway and discharged to either side of the saw.

Other objects, features, and advantages of the present invention will become more fully apparent from the following detailed description of specific embodiments, the appended claims, and the accompanying drawings.

BRIEF DESCRIPTION OF THE DRAWINGS

In the accompanying drawings:

FIG. 6 is a diagrammatic section on the line 6—6 in FIG. 4 of a modification of the circular saw;

FIG. 7 is a similar diagrammatic section to FIG. 6 with a component in a different position;

FIG. 9 is a section on the line 9—9 in FIG. 8; and

DESCRIPTION OF PREFERRED EMBODIMENTS

Figure 1:
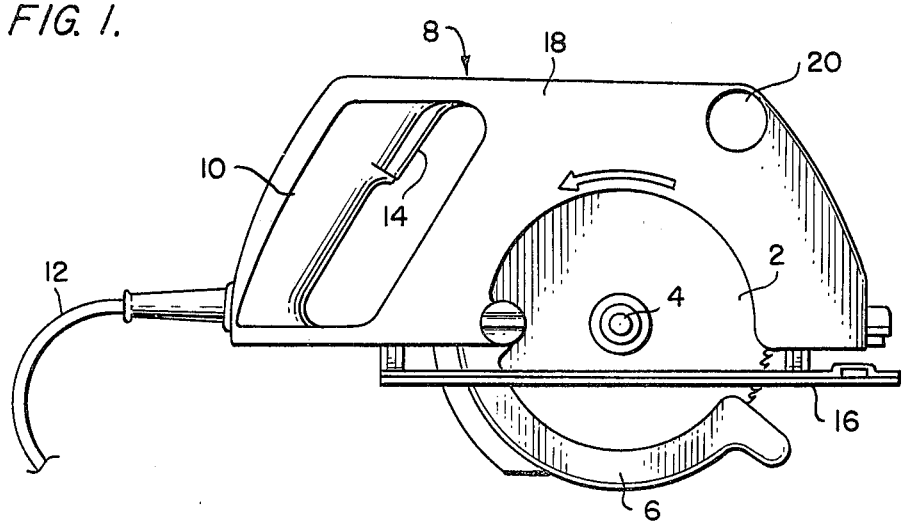
FIG. 1 is an elevational view of the righthand side of a portable circular saw employing the present invention.

FIG. 1 depicts a portable circular saw having a circular saw-blade 2 detachably secured to a drive shaft 4 in known manner. The lower portion of the blade 2 is shielded by a pivoted retractable cover 6 in known manner. The operational components of the circular saw are contained in a housing 8 which also serves to shield the upper portion of the blade 2. The housing 8 is formed with a rear closed handle 10 rearwardly from which extends an electric cable 12. An on/off trigger switch 14 is provided in the upper part of the closed handle 10 which is shaped to enable the handle 10 to be conveniently and securely gripped by an operator's right hand. Mounted below housing 8 is a base plate 16 for engaging and sliding on any workpiece to be cut. The complete righthand side of the housing 8 is formed by a first housing part 18 molded from plastics material and having a port 20 therein.

Figure 2:
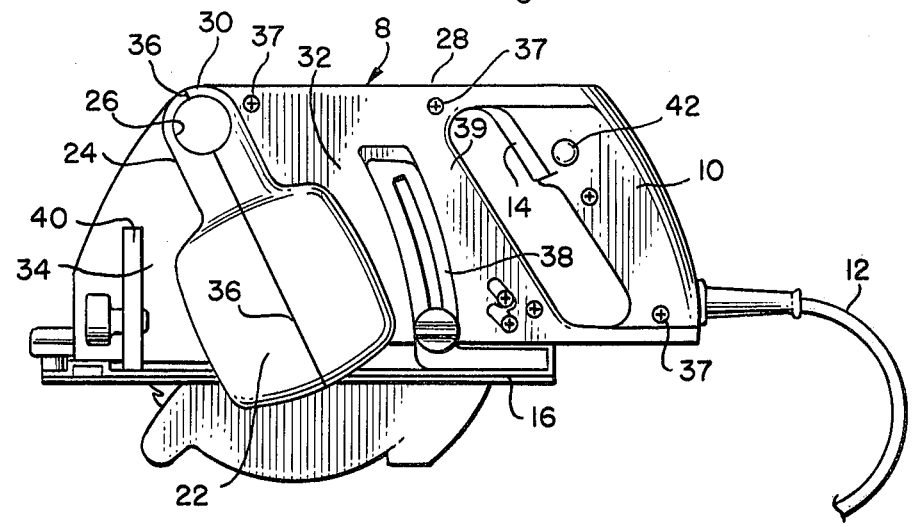
FIG. 2 is a side view of the lefthand side of the circular saw in FIG. 1.

FIG. 2 depicts the lefthand side of the circular saw and shows a motor compartment 22 and a forward closed handle 24 which is hollow and has a passageway 26 therethrough which registers with the port 20 in FIG. 1. The upper surface 28 of the casing 8 is flat and in a plane at right angles to that of the saw-blade 2. The extreme upper surface portion 30 of the forward handle 24 is in the same plane as the surface 28. The complete lefthand side of the housing 8 is formed by a second housing part 32 and a third housing part 34, both molded from plastics material. The second housing part 32 forms one side of the rear handle 10, the rear half of the forward handle 24, the rear half of the motor compartment 22, and a portion of the lefthand side of a compartment 39 containing the saw-blade 2. The third housing part 34 forms the forward half of the forward handle 24, the forward half of the motor compartment 22, and a portion of the saw-blade compartment 39. The forward handle 24 is disposed adjacent the front of the circular saw and forward of the central axis of the motor compartment 22. The second and third housing parts 32,34 abut each other in a plane and form a joint 36 between the halves of the motor compartment 22 and the two halves of the forward handle 24. The plane of the joint 36 is at right angles to that of the saw-blade 2 and is inclined forwardly of the plane containing the surfaces 28 and 30 at an angle of 60 degrees. The second and third housing parts 32,34 are secured to the first housing part 18 by seven screws 37.

The base plate 16 has a mechanism 38 for adjusting its position relative to the casing 8 for adjusting the depth of cut that can be made by the saw-blade 2, and also has a mechanism 40 for adjusting the position of the base plate 16 to determine the angle of cut that can be made.

A depressable button 42 enables the trigger switch 14 to be releasably locked in the "on" position during operation.

Figure 3:
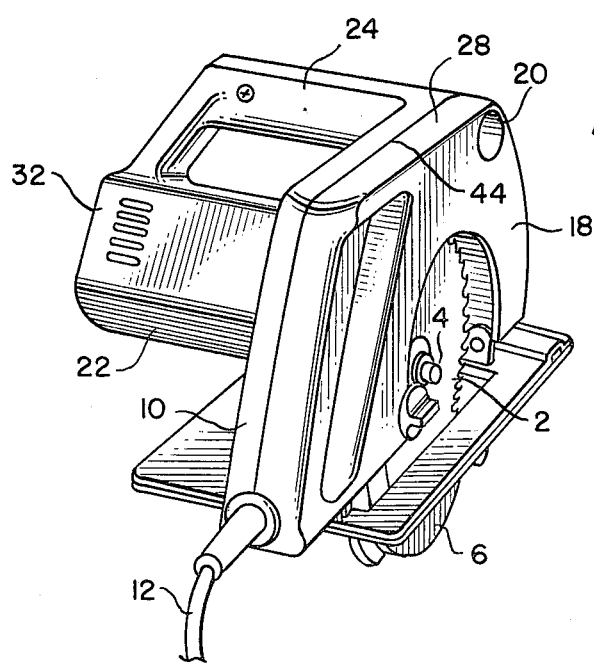
FIG. 3 is a rear perspective view of the circular saw.

FIG. 3 more clearly shows the forward closed handle 24 and its integral connection to the motor compartment 22. The flat upper surface 28 of the housing 8 is also more clearly shown. The first and second housing parts 18,32 abut each other in a plane and form a joint 44 which lies in the plane of rotation of the saw-blade 2. The joint 44 equally divides the rear handle 10 and the saw-blade compartment in the longitudinal direction and is in the plane of rotation of the saw-blade 2.

Figure 4:
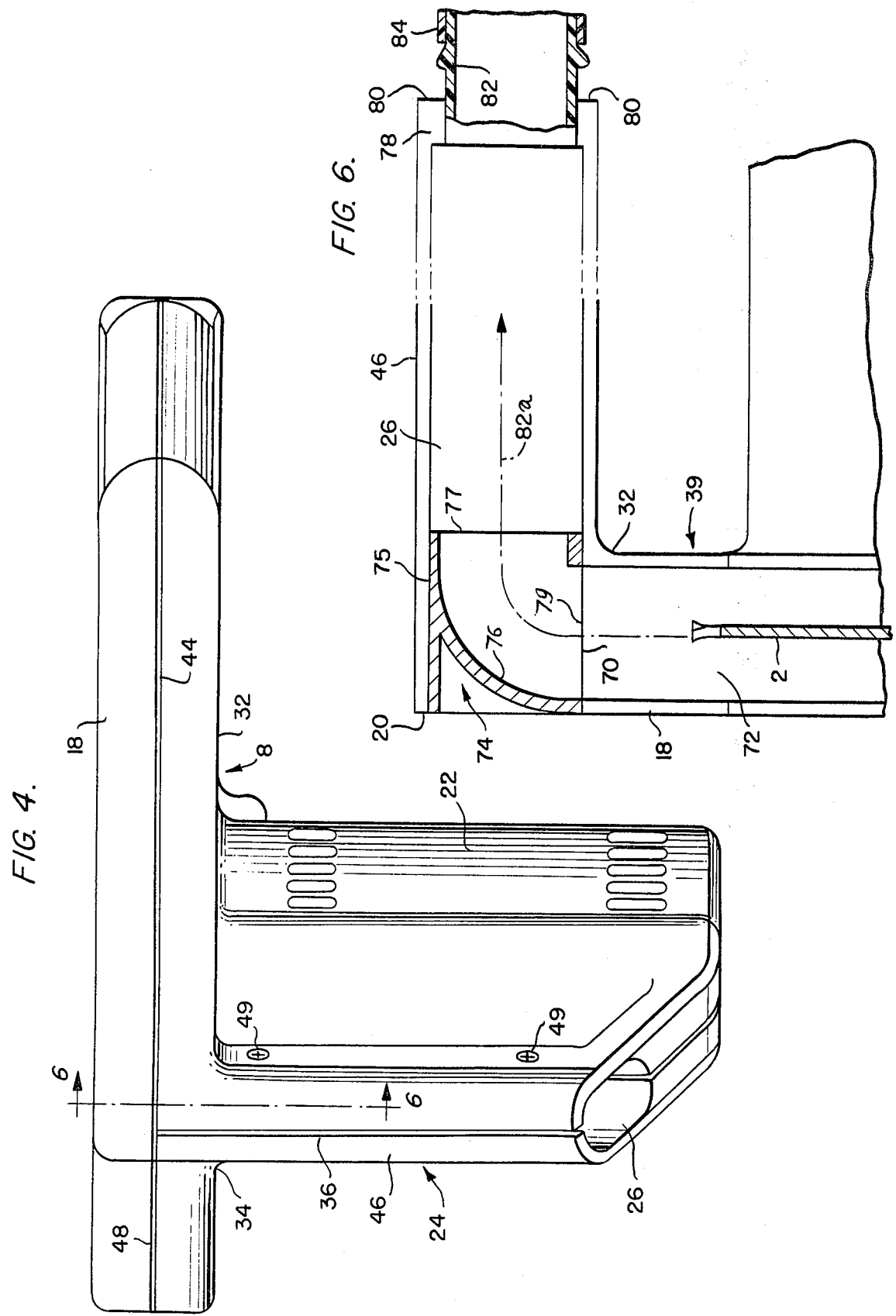
FIG. 4 is a plan view of the housing of the circular saw.

FIG. 4 shows the three housing parts 18,32,34 forming the housing 8 with all other components omitted. The closed handle 24 has a grip portion 46, which is at right angles to the first housing part 18, and a strut-like portion connecting the grip portion 46 to the outer end of the motor compartment 22. The first and third housing parts 18,34 abut in a joint 48 which is in line with the joint 44. The second and third housing parts 32,34 are secured to each other by screws 49, two of which can be seen in FIG. 4.

It will be appreciated that by manufacturing the housing 8 from only three parts 18,32,34, which are arranged to fit together as described above, the circular saw can be more easily and simply assembled. During assembly, the motor (to be described later) can be placed in one of the motor compartment halves and then clamped therein, in clamshell fashion, by securing the other motor compartment half. The first housing part 18 can be positioned and secured last, so leaving the housing completely open on one side during assembly and allowing easy access for making wiring connections and installation of other internal components.

By having a forward closed handle 24 integrally connected to the motor compartment 22, together with a rear handle of closed construction, a sturdy housing 8 is produced. This construction allows the three housing parts to be molded from suitable plastics material so reducing further the cost of manufacture and also making possible the production of a lighter weight, portable circular saw.

By having the rear closed handle 10 in line with the saw-blade 2, together with the forward closed handle 24 adjacent the top of the circular saw and forward of the motor compartment 22, and so forward of the saw-blade drive shaft 4, the saw can more easily and accurately be controlled by an operator. This is of particular importance when the operator is trying to accurately cut in a straight line. It should be noted that by having the two handles so arranged with the motor compartment 22 between them, and with the forward handle extending outwardly virtually for the length of the elongated motor compartment, the saw, when gripped by the operator, is balanced about the motor compartment 22.

Figure 5:
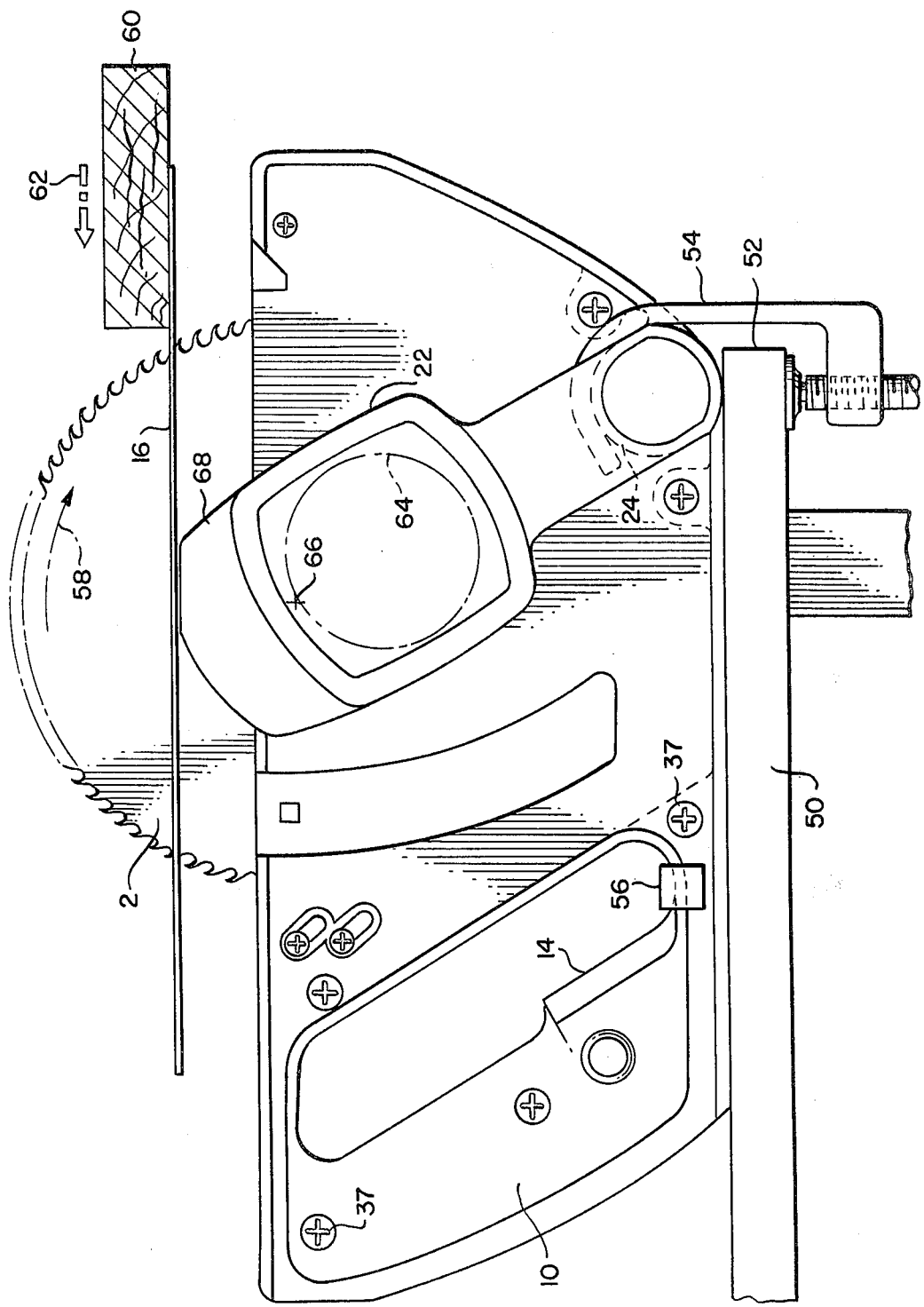
FIG. 5 is a diagrammatic elevation of the circular saw inverted and positioned to operate as a table saw.

FIG. 5 depicts diagrammatically the circular saw described above arranged to be used as a table saw. The circular saw is turned upside down from its normal operating position and placed on a corner of a suitable workbench or table 50. The grip portion of the forward handle is located adjacent and parallel to the front edge 52 of the table 50. The first housing part 18 is placed adjacent a side edge (not shown) of the table 50. Due to the flat surface 28 and the upper surface 30 of the forward handle 24 being in a common plane (see FIGS. 2 and 3), which is parallel to the normal operating position of the base plate 16, the circular saw rests safely on the table 50. The stability of the circular saw in this position is enhanced by the length, position, and construction of the forward closed handle 24, the right angle relationship of the forward handle 24 to the plane of rotation of the saw-blade 2, and the width and length of the flat surface 28. The grip portion of the forward handle is now clamped securely to the table 52 by an adjustable clamp 54. The rear closed handle 10 is also clamped securely to the table 52 by another clamp 56, without interfering with the trigger switch 14. With the base plate 16 set as shown, the saw is started with the blade rotating in the direction of the arrow 58, and a workpiece 60 to be cut is fed on the base plate 16 in the direction of the arrow 62. For simplicity the pivoted blade cover 6 has been omitted in FIG. 5. In normal operation the cover 6 would be pivoted to the left in FIG. 5 by the workpiece 60 as it passes by the rotating saw-blade 58.

In FIG. 5 the electric motor 64, which is contained in the motor compartment 22, is shown schematically by a broken line. The motor 64 is contacted by inner wall portions of the two halves of the motor compartment 22 in clamshell fashion. The axis of rotation of the saw-blade 2 is marked at 66. The motor 64 drives the saw-blade shaft through gearing (not shown) partially housed in a compartment 68 which is an extension of the motor compartment 22.

FIG. 6 depicts a modification of the circular saw and shows the passageway 26 having an opening 70 adjacent the port 20. The opening 70 is partly formed in the first housing part 18 and partly formed in the second housing part 32. The third housing part 34 completes the formation of the opening 70, although this cannot be seen in FIG. 6. The opening 70 enables the passageway 26 to communicate with the interior 72 of the blade compartment 39 housing the saw-blade 2. A deflector member 74 is a close slidable fit in the port 20 and the passageway 26. The member 74 is formed from a sleeve 75 having one end closed by a curved wall 76, and the other end 77 open. An orifice 79 through the side wall of the sleeve 75 intermediate its ends registers with the opening 70. As can be best seen in FIG. 5, the passageway 26 has a cross section which is not completely circular. The port 20 has the same cross section. The exterior surface of the sleeve 75 also has the same cross-sectional shape to prevent rotation of the sleeve 75 relative to the passageway 26 so ensuring continuous registering of the orifice 79 and the opening 70. The outermost part of the handgrip 46 (to the right in FIG. 6) is provided with a socket 78, the outer edge 80 of which is disposed in a substantially vertical plane. The socket 78 is adapted to releasably receive a hose adaptor 82 having a hose 84 of a vacuum system attached thereto.

In operation, the hose 84 is connected to a source of vacuum (not shown). Sawdust thrown up in the interior 72 of the blade compartment 39 by the action of the rotating blade 2 is sucked by the vacuum source, together with air, through the opening 70 and via the deflector member 74 through the passageway 26 in the grip portion 46 of the forward handle 24, as indicated by the arrow 82a. The sawdust and air exit from the passageway 26 and are drawn away through the hose 84 to a sawdust receptacle (not shown).

FIG. 7 shows another position of the deflector member 74 when it is desired to discharge the sawdust on the opposite side of the circular saw. From the position shown in FIG. 6, the deflector member 74 is slidably withdrawn, axially reversed, and then slidably inserted, closed end first, into the port 20 and passageway 26 until the orifice 79 registers with the opening 70. The hose adaptor 82 is then withdrawn from the socket 78 and inserted in the open end 77 of the member 74, with the vacuum hose 84 now discharging to the opposite side of the saw. In operation, the sawdust and air are drawn by the vacuum source through the opening 70, the deflector member 74, and the hose adaptor 82 as indicated by the arrow 86, i.e., out of the righthand side of the circular saw as viewed in FIG. 3. Thus, by choosing the orientation and location of the deflector member 74, the operator can determine on which side of the circular saw the sawdust should be discharged.

It should be noted that by molding the housing parts 32 and 34 to form the passageway 26, a separate conduit for dust removal does not have to be provided, the forward handle 24 serving two functions, that of a handle and that of part of the dust removal system. Also, with the position of the forward handle 24 being at the top of the saw and forward of the motor compartment 22, the vacuum hose 84 extends from either side of the saw in a position that does not interfere with the operator's grip of either handle 24 or 10 nor with the operator's view of the workpiece and the cut being made. Also, communication of the passageway 26 with the interior 72 of the saw-blade compartment at a location forward of the axis of rotation of the saw-blade 2, aids more complete removal of the dust by the vacuum source in conjunction with the action of the saw-blade 2 which still has a substantial upward component of movement approaching and adjacent that location.

Figure 8:
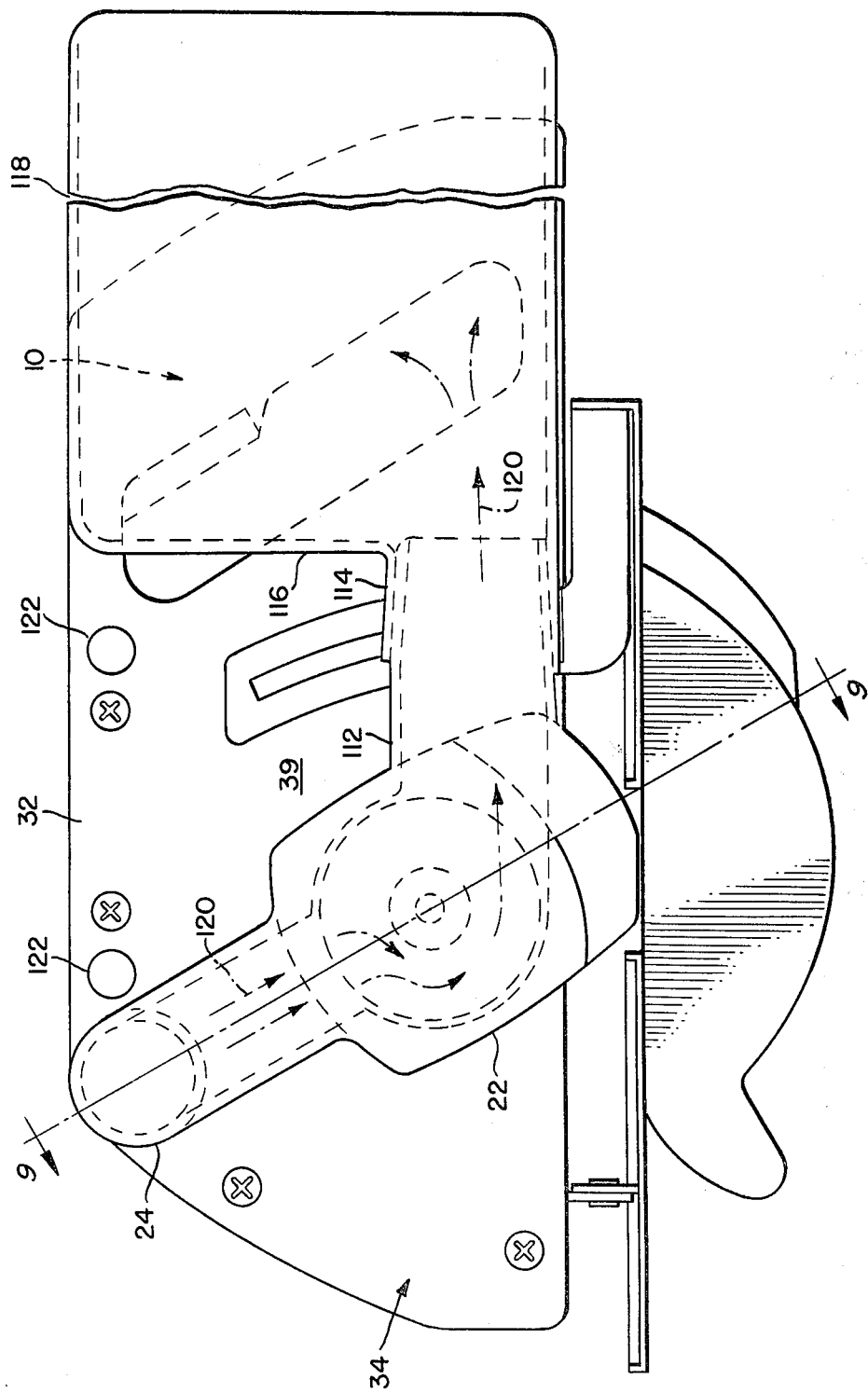
FIG. 8 is an elevational view of the lefthand side of the preferred embodiment of the circular saw employing the present invention.
Figure 10:
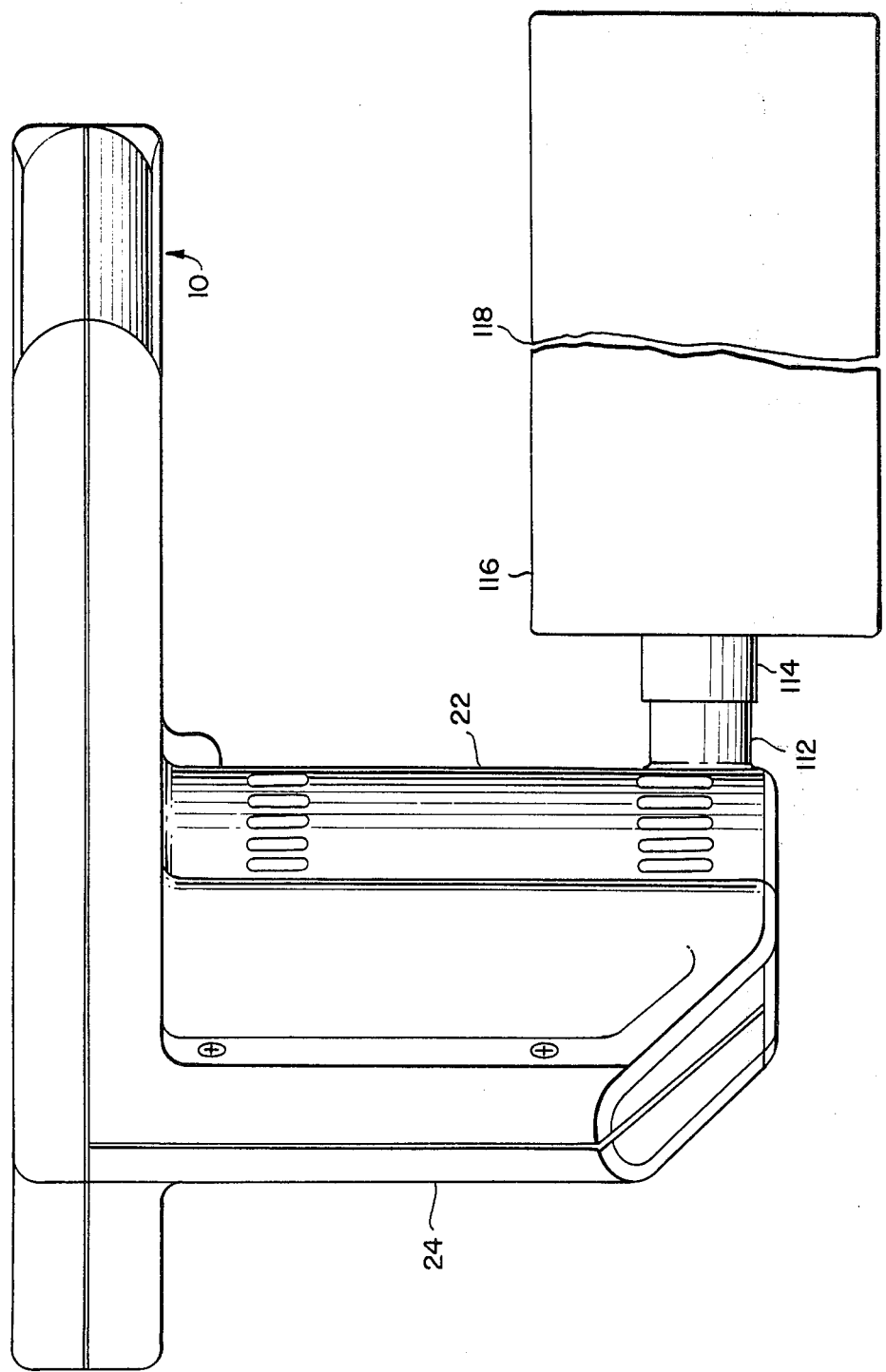
FIG. 10 is a simplified plan view of the circular saw in FIG. 8.

FIGS. 8, 9, and 10 depict the preferred embodiment of the portable circular saw. This embodiment is the same as that described in relation to FIGS. 1 through 5 except for two features. Firstly, the provision of a self-contained dust removal system and, secondly, the provision of means to facilitate clamping the saw in an inverted position when it is to be used as a table saw. The saw housing has three parts 18, 32, and 34 as before which conjointly between them form the forward closed handle 24, the rear closed handle 10, the motor compartment 22, and the saw-blade compartment 39. The forward handle is hollow and has a passageway 90 formed therein. However, the passageway is not open to the exterior of the saw at its ends.

Turning to FIG. 9, the passageway 90 communicates at one end with the interior 72 of the saw-blade compartment 39 via an opening 92. At the other end, passageway 90 extends through a downward arm or strut 94 of the closed handle 24 and communicates with an inlet 96 of a fan compartment 98 in the motor compartment 22. The electric motor 64 in the compartment 22 is drivingly connected at its inner end to the saw-blade 2 through gearing 100, with a motor cooling fan 102 mounted on armature shaft 104 between the motor 64 and the gearing 100. At the outer end of the motor 64, the armature shaft 104 extends through a bearing 106, in a bearing housing 108, terminating in the fan compartment 98 in which is housed a centrifugal fan impeller 110 mounted on that end of the shaft 104 and closely fitting in the fan compartment 98. It should be noted the housing part 18 does not have the port 20 therein shown in FIG. 1.

Turning now to FIG. 8, the fan compartment communicates with a rearwardly extending nozzle 112 over which is attached the neck 114 of a dust bag 116, part of the length of bag 116 being omitted at 118.

As can be seen in FIG. 10, the nozzle 112 is located at the outward end of the motor compartment 22 with the dust bag 116 spaced a convenient distance from the rear closed handle 10.

In operation, the motor 64 rotates the centrifugal fan 110 to draw sawdust and air from the interior 72 of the blade compartment 39, through the passageway 90, into the fan 110 which then discharges the dust and air into the dust bag 116 which retains the dust, the air escaping through the bag 116. This flow of air and dust is indicated by arrows 120 in FIGS. 8 and 9.

With this embodiment, the hollow forward handle again serves the dual functions of a handle and part of a dust removal system, and it should be noted that all of the passageways and compartments of the dust removal system are formed by the three housing parts 18, 32, and 34, with the housing parts 32 and 34 conjointly forming the passageway 90 and fan compartment 98. Again, this dust removal system, due to the utilization of the forward handle 24, does not interfere with an operator's grasp of the two handles 24 and 10, nor his sight of the workpiece being cut. Also, by positioning the dust bag rearwardly of the outer end of the motor compartment 22, any tendency for the dust bag to effect a turning moment lengthwise of the saw can be readily compensated by the thrust of the operator on the forward handle 24; this is further helped by the arrangement of the forward and rear handles causing the saw to be balanced about the motor compartment.

In FIG. 8 are shown two bores 122 in the housing part 32. These bores extend through housing part 18 and have walls (not shown) which separate them from the interior 72 of the blade compartment 39. These bores are adapted to receive straight rod-like legs of clamps. When this embodiment is to be used in the inverted position as a table saw, it is readily and safely clamped to a bench top by using clamps having a straight rod-like clamping arm, inserting the straight arms through the bores 122, and tightening the clamps on the underside of the bench top.

The above described embodiments, of course, are not to be construed as limiting the breadth of the present invention. Modifications, and other alternative constructions, will be apparent which are within the spirit and scope of the invention as defined in the appended claims.

What is claimed is:
1. A portable circular saw or the like comprising:
   a saw-blade compartment for accommodating a circular saw-blade;
   a motor compartment secured to the saw-blade compartment and projecting transversely therefrom;
   a motor in the motor compartment for driving the saw-blade;
   a rear handle extending rearwardly from the saw-blade compartment;
   a forward handle connected to the saw-blade compartment and projecting transversely therefrom on the same side thereof as said motor compartment;
   said saw blade compartment, said motor compartment, said rear handle and said forward handle being formed from three separate housing parts;
   the first of said housing parts forming one side of said rear handle, and a portion of said saw-blade compartment;
   the second of said housing parts forming the other side of said rear handle, a portion of said motor compartment, another portion of said saw-blade compartment, and a portion of said forward handle, said first and second housing parts abutting each other; and
   the third of said housing parts forming the remainder of said motor compartment, the remainder of said forward handle, and the remainder of said saw-blade compartment, said third and first housing parts abutting each other, and said third housing part abutting said second housing part along a plane transverse to the plane of rotation of the circular saw-blade.
2. The portable circular saw as claimed in claim 1, comprising a strut connecting the forward handle to the motor compartment at a location spaced from the saw-blade compartment thereby defining a closed handle.
3. The portable circular saw as claimed in claim 2, wherein the rear handle is a closed handle formed as a rearward extension of the saw-blade compartment substantially in line with the plane of the saw-blade.
4. The portable circular saw as claimed in claim 1, wherein the forward handle, the saw-blade compartment and the rear handle have upper surfaces which lie in a common plane to enable the portable circular saw to be inverted from its normal operating position and used as a table saw.
5. The portable circular saw as claimed in claim 1, wherein the forward handle has a handgrip portion which is disposed above, forward of, and substantially parallel to the rotational axis of the saw-blade.
6. The portable circular saw as claimed in claim 1, wherein:
   said motor compartment has a discharge outlet;
   said forward handle has a strut connecting a hand grip portion of said forward handle to said motor compartment to form a closed handle;
   a fan is mounted in said motor compartment for rotation by said motor; and
   said hand grip portion and said strut have a passageway therethrough communicating at one end with the interior of said saw-blade compartment and at the other end with said fan, whereby in use sawdust generated in said saw-blade compartment is drawn by said fan through said passageway and discharged through said discharge outlet.

7. The portable circular saw as claimed in claim 6, wherein said discharge outlet is formed by a nozzle extending rearwardly from said motor compartment and adapted to receive a dust bag.

8. The portable circular saw as claimed in claim 6, wherein said grip portion extends from said saw-blade compartment substantially parallel to the axis of rotation of the saw-blade and is disposed adjacent the top of said saw-blade compartment forwardly of said axis of rotation.

9. A portable circular saw, comprising:
a motor for drivingly rotating a circular saw-blade;
a compartment partially containing and shielding said saw-blade, and having a port disposed in one side thereof;
a rear handle extending from said saw-blade compartment;
a forward handle disposed substantially parallel to the axis of rotation of said circular saw-blade at a location forward of and above said axis of rotation, and having a passageway therethrough communicating with said port and the interior of said saw-blade compartment; and
a deflector member at least partially disposed in said passageway and movable between first and second positions to enable the sawdust occurring in use in said saw-blade compartment to be withdrawn from one side of said circular saw through said port or from the opposite side of said circular saw through said passageway, respectively.

10. The portable circular saw as claimed in claim 9, wherein said deflector member comprises a sleeve slidably insertable in said port and said passageway and having a closed end, an open end, and an orifice intermediate said ends in communication with said saw-blade compartment, whereby when said sleeve is inserted in said port closed end first said deflector member is in said first position, and when said sleeve is inserted in said port open end first said deflector member is in said second position.

11. A portable circular saw, comprising:
a motor compartment having a rearwardly extending discharge nozzle;
an electric motor housed in said motor compartment for rotationally driving a circular saw-blade and having an armature shaft from one end of which the saw-blade is driven;
a saw-blade compartment for partially housing and guarding the saw-blade;
a closed rear handle extending rearwardly from said saw-blade compartment;
a closed forward handle having a grip portion connected at one end to said saw-blade compartment and extending therefrom substantially parallel to the axis of rotation of the saw-blade, and a connecting portion connecting the other end of said grip portion to said motor compartment;
a fan mounted in said motor compartment on the other end of said armature shaft;
said grip portion and said connecting portion having a passageway therethrough communicating at one end with the interior of said saw-blade compartment and at the other end with said fan;
a first housing part forming one side of said rear handle, and a portion of said saw-blade compartment;
a second housing part forming the other side of said rear handle, a portion of said motor compartment, another portion of said saw-blade compartment, and a portion of said forward handle, said first and second housing parts being attached and abutting each other along a plane which is the plane of rotation of the circular saw-blade;
a third housing part forming the remainder of said motor compartment, the remainder of said forward handle, and the remainder of said saw-blade compartment, said first and third housing parts being attached and abutting each other along said plane of rotation, and said third housing part abutting said second housing part along a plane at right angles to said plane of rotation, said plane of abutment of said second and third housing parts being inclined in the forward direction of said portable circular saw with said forward handle grip portion being forward of said motor compartment;
said first and second housing parts having upper edges which are flat and lie in a common plane at right angles to the plane of rotation of the circular saw-blade;
said forward handle having an extreme upper surface portion which lies in said common plane of said first and second housing part upper edges; and
whereby said rear handle is conjointly formed by said first and second housing parts, said motor compartment, said forward handle and said passageway are conjointly formed by said second and third housing parts, and in use sawdust generated in said saw-blade compartment is drawn by said fan through said passageway and discharged through said discharge nozzle.

12. A portable circular saw comprising:
an elongated motor compartment;
an electric motor housed in said motor compartment for rotationally driving a circular saw-blade;
a saw-blade compartment for the circular saw-blade;
a rear closed handle extending rearwardly from said saw-blade compartment;
a forward handle extending from said saw-blade compartment in a direction parallel to the longitudinal axis of said motor compartment, said forward handle being spaced away from and forwardly of said motor compartment in the direction of cut and having a strut portion connected to said motor compartment at a location spaced from said saw-blade compartment;
a first housing part forming one side of said rear handle, and a portion of said saw-blade compartment;
a second housing part forming the other side of said rear handle, a portion of said motor compartment, another portion of said saw-blade compartment, and a portion of said forward handle, said first and second housing parts being attached and abutting each other along a plane which is the plane of rotation of the circular saw-blade;
a third housing part forming the remainder of said motor compartment, the remainder of said forward handle, and the remainder of said saw-blade compartment, said first and third housing parts being attached and abutting each other along said plane of rotation, and said third housing part abutting said second housing part along a plane at right angles to said plane of rotation, said plane of abutment of said second and third housing parts being inclined in the forward direction of said saw;
said first and second housing parts having upper edges which are flat and lie in a common plane at right angles to the plane of rotation of the circular saw-blade; and said forward handle having an extreme upper surface portion which lies in said common plane of said first and second housing part upper edges, enabling said portable circular saw to be inverted from its normal operating position and used as a table saw.

13. The portable circular saw as claimed in claim 12, wherein said first and second housing parts have two bores therethrough, both bores being adjacent said flat upper edges of said first and second housing parts, one bore being located rearwardly of and adjacent said forward handle, and the other bore being located forwardly of and adjacent said rear handle, whereby said bores are adapted to be engaged by clamps when said portable circular saw is to be used as a table saw.

14. The portable circular saw as claimed in claim 12, wherein said forward handle has a passageway therein which communicates with said saw-blade compartment and is adapted to form part of a sawdust removal system.

* * * * *